Oct. 19, 1971             D. H. SCHUSTER             3,613,263
PERIPHERAL VISION DISPLAY PANEL FOR AUTOMOBILE DRIVER TRAINERS
Original Filed July 21, 1967             3 Sheets-Sheet 1
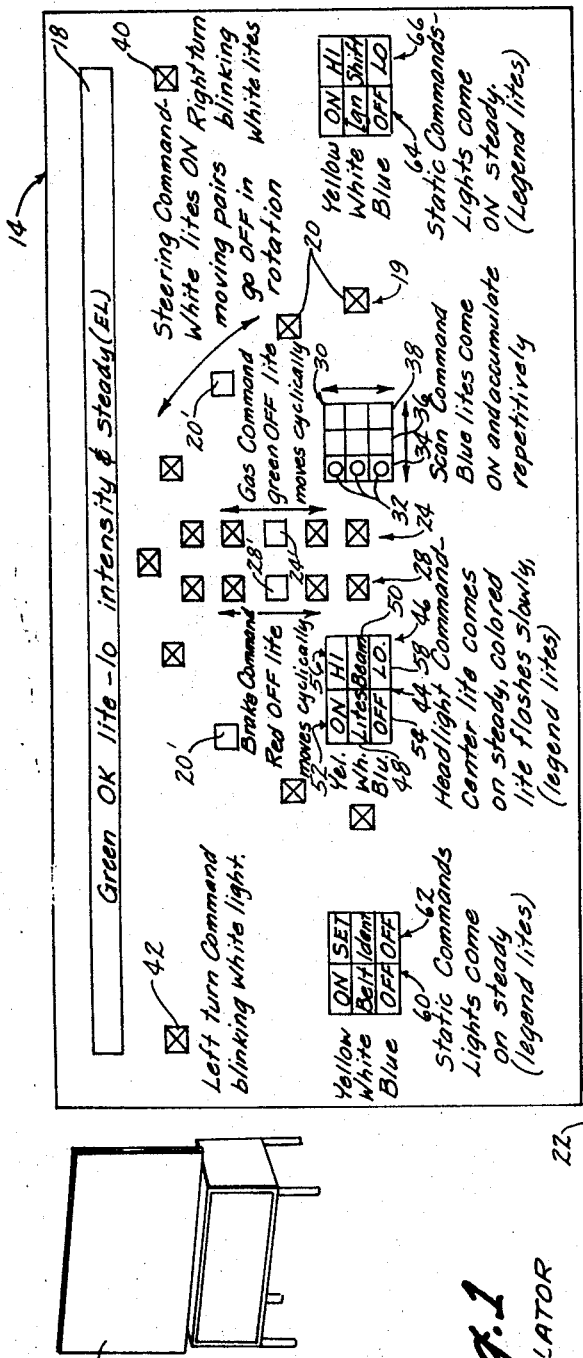
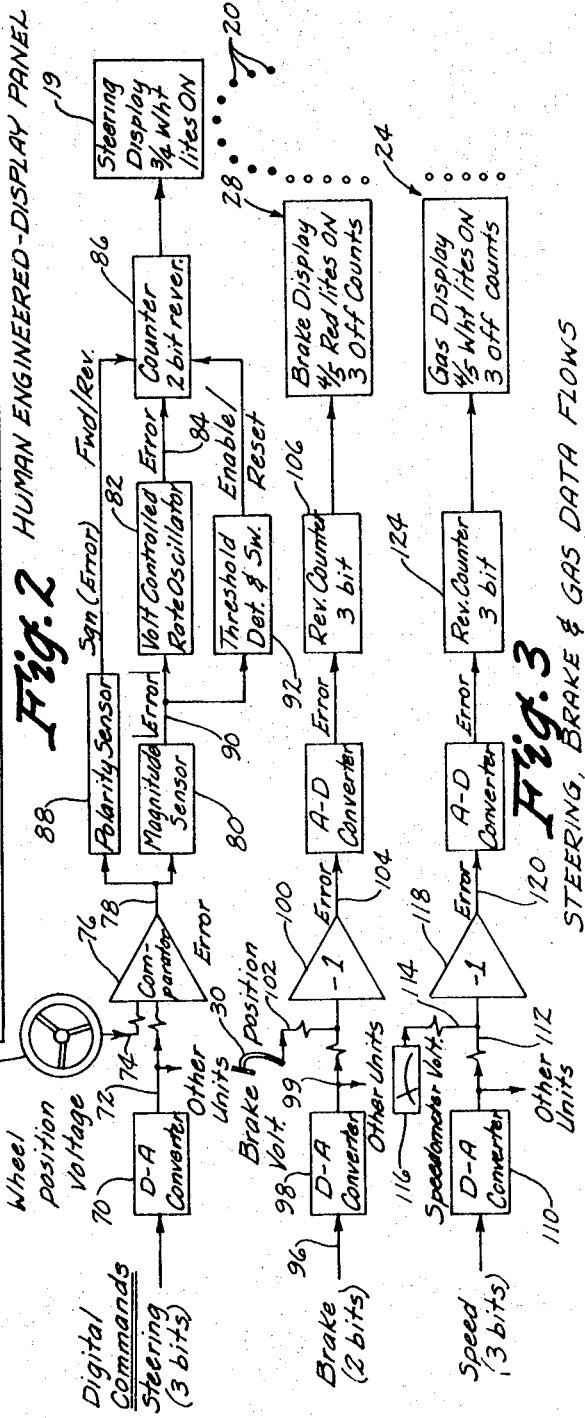
INVENTOR
DONALD H. SCHUSTER
BY
Zarley, McKee + Thomte
ATTORNEYS

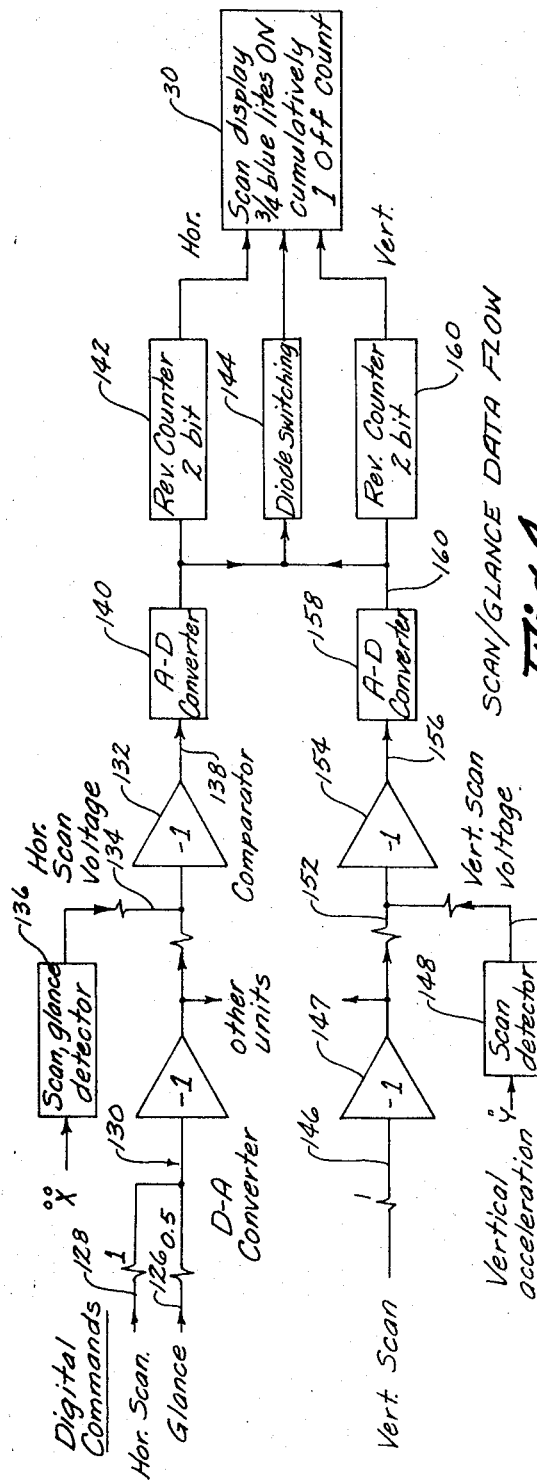
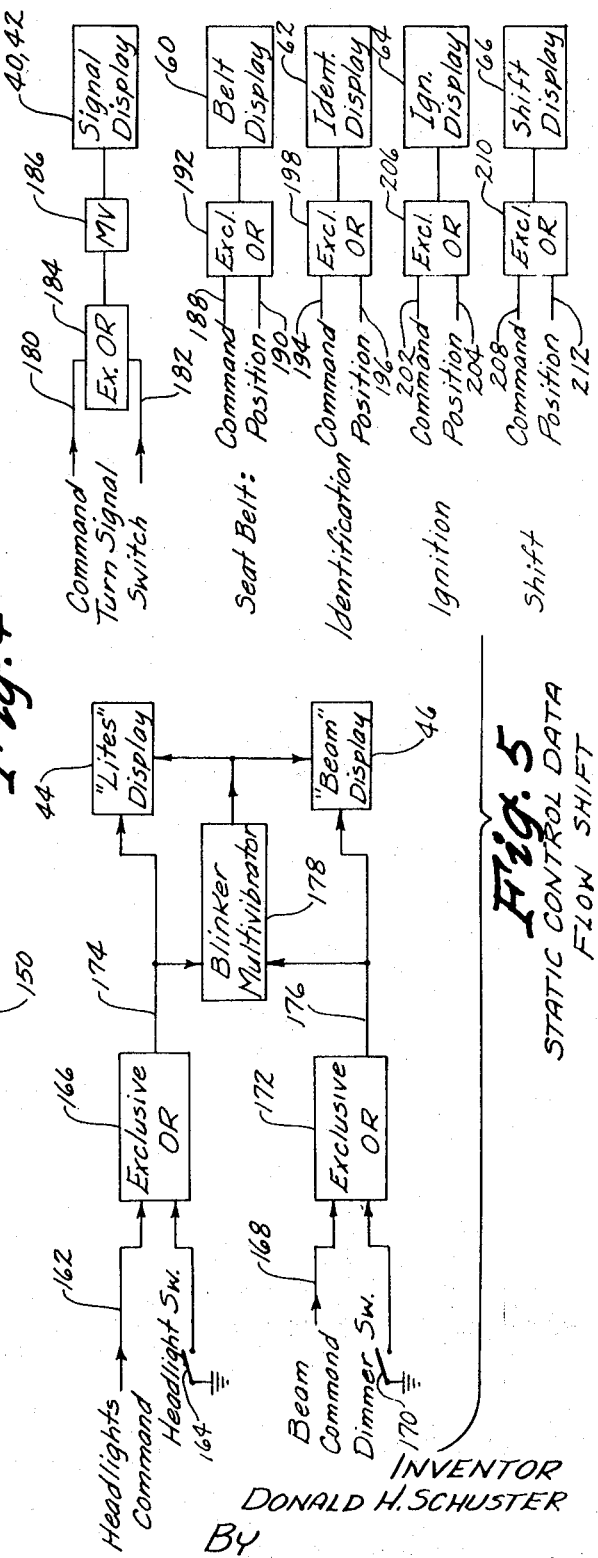

Oct. 19, 1971  D. H. SCHUSTER  3,613,263
PERIPHERAL VISION DISPLAY PANEL FOR AUTOMOBILE DRIVER TRAINERS
Original Filed July 21, 1967  3 Sheets-Sheet 3

STEERING DATA FLOW

ERROR RATE REVERSIBLE COUNTER

STEERING COMMAND LIGHT LOGIC

INVENTOR
DONALD H. SCHUSTER
BY
Zarley, McKee & Thomte
ATTORNEYS

United States Patent Office 3,613,263
Patented Oct. 19, 1971

3,613,263
PERIPHERAL VISION DISPLAY PANEL FOR
AUTOMOBILE DRIVER TRAINERS
Donald H. Schuster, Ames, Iowa, assignor to Iowa State
University Research Foundation, Ames, Iowa
Continuation-in-part of application Ser. No. 655,045, July
21, 1967, now Patent No. 3,523,374, dated Aug. 11,
1970. This application June 19, 1969, Ser. No. 834,794
Int. Cl. G09b 9/04
U.S. Cl. 35—11                                                       9 Claims

ABSTRACT OF THE DISCLOSURE

A device used with automobile driver trainers including a display panel mounted just below the driver's view as he watches the driver training film on a projection screen. The driver's responses to the driver training film are compared with film commands and the errors are converted to corrective commands expressed by the display panel directing the driver through his peripheral vision to take specific corrective action. The magnitude of the corrective action required is indicated by the speed of the cyclical repetition of the corrective commands. The signalling lights on the display panel issuing the corrective commands are situated in their relationship corresponding to the operative controls of the driver trainer unit. Upon the giving of proper responses to the situations presented on the screen the display panel will signal no corrective action is required of the student driver.

---

This application is a continuation-in-part of my Driver Training and Testing Equipment appilcation, Ser. No. 655,045 filed July 21, 1967, now Pat. No. 3,523,374, issued Aug. 11, 1970.

In my parent application I have disclosed the driver trainer unit employing movie film and coded with electrical signals which correspond to successive driving situations on the film and are compared with signals received from the driving controls of the driver trainer upon being operated by a student. An instantaneous display panel for indicating the correctiveness of the response by the student to each of the successive driving situations and a permanent magnetic recording means for storing the comparative information is provided. An adaptive stresser unit is also used having an audio unit which may be simultaneously used to provide secondary auditory perceptual loading on the student. The recognition device indicator is coupled to the stresser unit to control the rate of loading of the auditory signals on the student.

In the present application it is desired to compare the responses of the student to driving situations with correct responses and then present corrective commands on a display panel visible to the student through his peripheral vision. Upon the student's taking appropriate corrective action in response to these corrective commands the display panel will indicate that no further corrective action need be taken. Communication of the corrective commands to the student is entirely through the student's peripheral vision, preferably his lower peripheral vision since the corrective command display panel is located below the projection screen.

The corrective command signaling units on the corrective command panel are located in a manner to simulate the actual driving controls on the student trainer or an automobile. Thus, for example, a series of lights are provided in a semicircular shape and are successively lighted from right to left or left to right to indicate steering action to the right or to the left is required. A set of vertical lights is provided for braking and also a set of vertical lights is provided for the gas (accelerator). If the student should be scanning and isn't, the driving situation presented on the film corrective commands will be presented on a matrix of lights including rows of horizontal and vertical lights which will be successively lighted from one side to the other in the direction of the desired scanning. The illumination of one row after another gives the illusion of a wedge expanding outwadrly in the direction the student should do the scanning.

A number of stationary static lights are provided to signal other corrective steps that should be taken by the driver such as turning on or off his driving lights or operating his turn signals.

Thus, through the use of the display panel, the commands displayed thereupon can be attended to by the student driver with his peripheral vision and the driver need not look directly at the panel, although he may, to see its commands. The amount of corrective action that needs to be taken will be indicated by the speed of the cycles of corrective commands.

These and other features and advantages of this invention will become readily apparent to those skilled in the art upon reference to the following description when taken into consideration with the accompanying drawings wherein:

FIG. 1 is a perspective view of the driver training unit, projection screen and corrective command display panel;

FIG. 2 is a plan view of the corrective command display panel;

FIG. 3 is a schematic drawing of the steering, brake and gas data flows in connection with the display panel;

FIG. 4 is a schematic of the scan/glance command circuitry;

FIG. 5 is a schematic of the static controls corrective commnads circuitry; and

Figure 6:
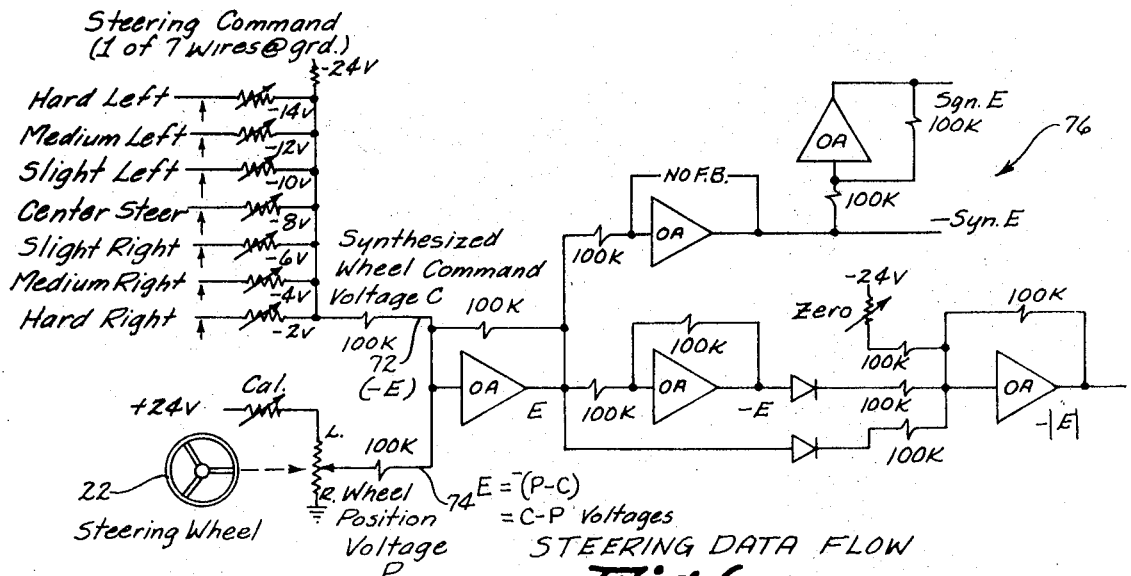
FIGS. 6, 7 and 8 are electrical schematics for the steering command circuitry.

A driver trainer unit 10 including a student seat 12 is shown in FIG. 1 and a display panel 14 is mounted on the trainer unit 10 directly in front of the seat 12 in a position corresponding to the dashboard of a vehicle. A screen 16 is provided on which a training film is projected to be observed by the student who in turn operates the driver trainer unit 10. The student will through his peripheral vision observe the display panel 14 for corrective commands to take in response to his driving actions in operating the trainer 10.

The display panel 14 is shown in detail in FIG. 2 and gives the location of the lights for the various commands. At the top of the display panel is a low intensity green light-bar 18. When the light-bar 18 is on steadily it indicates that the driver is responding correctly to the scene in the movie on the screen 16 and need not make any further action or responses at that particular time.

In the center of the display panel is a semi-circle of white lights 20 to present a steering command using peripheral vision. Only two of the lights are off at a particular time in pairs and the remainder of the white lights are on at any given time. The X in the respective squares indicates that the lights are on.

To present a steering command, the white lights 20 will step off appropriately in rotation. For a command to turn right, the off lights 20' would step in rotation slowly clockwise, indicating that the driver should turn right. This is a very compelling illusion when seen. The speed of the jump-rotation depends upon the magnitude of the command. Thus, the rotation of the stepping indicates the direction in which the wheel 22 on the driver trainer unit 10 should be turned and the speed of movement indicates the magnitude of the command and how far to turn the wheel 22. When the steering wheel position agrees with that commanded the movement stops and the lights 20 reset to the no-command state.

The gas command is presented by a central vertical column of five green lights 24 with the center light 24' normally off. If the driver is to apply more gas, the green off light 24' moves up to the very top; then with a pause the off light reappears at the bottom and the green off light continues to move up. This gives the illusion of forward movement and commands more gas with a motion down on the gas pedal 26 in the trainer. Again the direction implies whether more or less gas is to be fed or the accelerator moved, and the speed of cycling indicates how much change. When the student driver responds with the appropriate correct foot position on the gas pedal, the gas command stops and the green off light 18 again appears in the center of the panel 14.

The brake command is implemented by a vertical column of lights 28 to the left of the gas command panel of lights 24. The brake and gas commands occupy the same positions as the brake pedal and gas pedal 30 and 26 respectively in a car or driver trainer. As for the gas command, the direction of motion indicates whether the person is to push down on the brake, indicated by a motion downward of a red off light 28', or whether a person is to let up on the brake, indicated by motion upward of the red off light 28'. The speed of motion upward or downward depends upon the magnitude of the command itself; that is, a harder brake command would have a faster vertical motion. When sufficient brake pedal position is accomplished, the brake command light stops moving and the red center light 28' is then off, indicating no further brake command.

The scan command is accomplished with a 3x3 square matrix 30 of blue lights 32 in the lower right center of the display panel 14. An edge row, or column, of lights 34 is first energized; then it stays on while the next row 36 is energized. These two rows 34 and 36 then stay on while the last row 38 is energized. At this stage, all of the lights 32 are on. Then all of the lights go off until the cycle resumes. A moving wedge is simulated and appears to expand right or left; alternatively it can move up and down. Thus the moving wedge illusion tells a driver to scan right or left, or up or down. As before the direction of the scan or glance is determined by which way the wedge expands and the speed indicates how far the student driver is to scan, glance or look.

The turn signal commands are similar to the conventional blinking turn signals on present day automobiles. That is, when the student driver is to signal for a right turn, a white light 40 in the upper right of the display panel 14 blinks until the student driver energizes his turn signal for a right turn. A similar situation exists for a left turn, with a blinking white light 42 in the upper left of the display panel. There is sense or direction information here only; there is no speed of command information.

In the bottom left center of the display panel 10 are two display lights 44 and 46 indicating whether the driver should turn his headlights on or off and whether he should use high or low beam position. The center lights 48 and 50 for either command comes on white steadily to indicate that something should be done with the headlights of the vehicle. Then the top or bottom lights 52 and 54 and 56 and 58 (yellow or blue respectively) blink slowly to indicate the specific action desired. Again there is no magnitude information here.

There are four miscellaneous static commands involving separate display lights 60, 62, 64 and 66 for seat belt, identification, ignition, and shift respectively which come on steadily requiring direct view. These commands are used only at the start and stop of driving the simulated car. They each involve three separate lights and function as the display lights 44 and 46 for the headlights.

Implementation of the peripheral vision display panel

Referring to FIG. 2, it is seen at the top of the figure that the data flow for the steering command implementation is provided. Three bits of steering information are converted to a seven level analog command (see FIG. 6) in the digital-to-analog converter, D-A converter 70. This output signal 72 is also fed in parallel to other student driver units. The actual steering wheel position as an analog voltage signal 74 is fed into an operational amplifier as a comparator 76 along with the seven level analog voltage command 72 in steering. The output 78 of the comparator represents the error voltage or difference between steering wheel position signal 74 vs. that commanded by the steering command 72.

Figure 7:
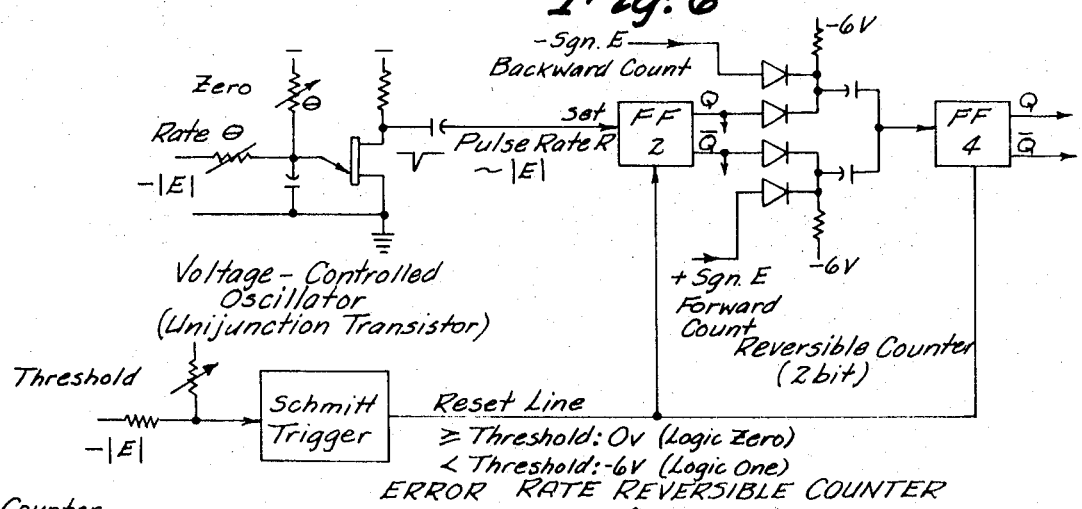
Figure 8:
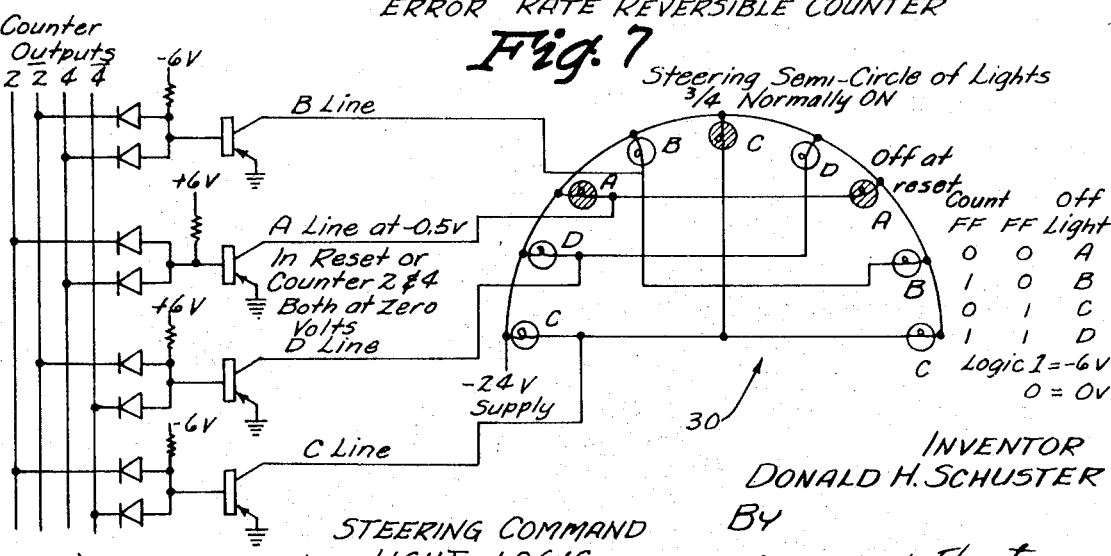

The steering error must have several things done to it. A magnitude sensor 80 as seen in detail in FIG. 7 determines the absolute value of the error and controls the rate of voltage controlled oscillator 82. The polarity or sign of the error voltage 78 is taken to determine which way the display should be commanded to move in rotation. Finally, until the magnitude becomes greater than some certain threshold, there is no display motion or no command presented to the student. The absolute value of the error, or error magnitude, controls the rate of a blocking oscillator wherein the voltage applied to the base determines the rate at which the oscillator blocks or repeats. The output pulses from this blocking oscillator go to a two bit reversible counter 86. The output of a polarity sensor 88 goes to diode gate which determines whether the counter counts forward or in reverse. The output 90 of the magnitude sensor 80 also goes to a threshold detector 92; whenever the threshold of the display is exceeded, the counter 86 is enabled to count forward or reverse. Whenever the threshold is not exceeded, the threshold detector 92 resets the counter 86 to zero, such that it displays no steering command on the steering display 20 on the panel 14.

The magnitude sensor 80 consists of an operational amplifier which inverts the error signal and two diodes such that a positive signal either from the inverter or from the comparator is fed to the voltage controlled oscillator 82.

The data flow for the brake information is also shown in FIG. 3. A two bit or four level brake command 96 is converted to an analog voltage in the digital-to-analog converter 98. In the comparator or summing operational amplifier 100, the output command voltage 99 of the converter 98 is compared with a voltage 102 which represents the actual brake pedal position. The output 104 of the comparator 100 is the difference between the command 99 and the brake position voltage 102, and is the error voltage 104. This error voltage is converted into magnitude, direction and threshold in a similar manner as was done for the steering data flow. The output of the reversible counter 106 thus is fed to the brake display and makes the center red light appear to move up and down to give the illusion of a moving column of red lights, with the off light moving up or down in the appropriate direction, and at a speed indicating the needed change in brake pedal position.

The speed data flow is given also in FIG. 3 and is completely analogous to the data flow for the brake data flow. Speed information is converted to eight levels in a digital-to-analog converter 110. This analog speed command voltage 112 is compared with the actual speed voltage 114 from the speedometer 116 and fed into a summing amplifier as a comparator 118. The difference between the speed command and the actual speed voltages 112 and 114 respectively comprises the error signal 120. As previously, the error signal 120 is split up into three components to control a reversible three bit counter 124. Three bit counter 124 then controls an off light 24' in a column of green lights 24 to indicate change gas feed, or left alone when the display is stationary.

The scan-glance data flow is shown in FIG. 4. The top flow diagram is concerned with the command for scanning horizontally or glancing horizontally. A slight motion of the head horizontally is interpreted to be a scan, whereas a large motion of the head as in turning to look over the shoulder is considered to be a glance. The driver is requested to scan the driver trainer movie from time to time and in preparation for turning or changing lanes, the driver must glance over the right and left shoulders appropriately. A horizontal scan or glance command 126 or 128 goes into its digital-to-analog converter 130. The gain of the glance command 126 is arbitrarily set at twice that of the horizontal scan command 128. The output of the digital-to-analog converter is a five level scan/glance command ranging in value from $-2, -1, 0, +1$ to $+2$ units. This voltage scan/glance command feeds into the comparator 132, a summing amplifier with a gain of $-1$. Also fed into this comparator 132 is the output 134 of the scan/glance detector 136, which detects head motions via their corresponding accelerations and translates these into an output pulse 134 indicating whether the head has been turned slightly for a scan or largely for a glance over the shoulder. The output 138 of the comparator is the difference between the command and actual scan information, and goes to an analog-to-digital converter circuit 140 as has been previously described. The scan counter 142 feeds the scan display 30. In addition the output of the horizontal analog-to-digital converter feeds a diode switching matrix 144 such that the blue scan lights 24 can be turned on horizontally appropriate.

The vertical scan command 146 is changed from digital-to-analog information by a summing amplifier 147. The vertical acceleration of the head in scanning back and forth between the display panel 14 in the movie scene 16 is detected with a vertical accelerometer 148 and changed to a scan pulse or voltage 150. The scan voltage 150 and the scan command 152 are fed into a comparator 154, whose output error 156 feeds another A–D converter 158. This converter controls a two bit reversible counter 160 to display the blue wedge-shaped motion of lights in the scan display 30 to give the illusion of up and down movement. The vertical scan converter output 160 also feeds the diode switching 144 such that only lights in a vertical direction are energized appropriately for vertical scan. This diode switching 144 is necessary to energize the lights 24 appropriately for vertical or horizontal scan commands.

The implementation of the static controls is shown in FIG. 5. The headlight command 162 and any voltage from a headlight switch 164 is received by an exclusive OR gate 166 and similarly, a beam command 168 along with any voltage from a dimmer switch 170 is received by an exclusive OR gate 172 and the outputs 174 and 176 respectively from the gates 166 and 172 are fed to a blinker multi-vibrator 178 and the light display 44 and the beam display 46 on the panel 14.

The turning signal command 180 and a voltage 182 from the turn signal switch are received by an exclusive OR gate 184 which feeds a multi-vibrator 186 in turn feeding the turn signal display lights 40 and 42. The seat belt command signal 188 and a voltage from the seat belt 190 are received by an exclusive OR gate 192 which in turn feeds the belt display 60. The identification command 194 and the position voltage 196 are received by the exclusive OR gate 198 which feds the identification display 62. Similarly, the ignition command 202 and any voltage 204 from the ignition switch are received by an exclusive OR gate 206 and the signal therefrom feeds the ignition display 64. Finally, a gear shift command 208 is received by an exclusive OR gate 210 along with any voltage 212 from the gear shift position and in turn the gate signals appropriate lights on the shift display 66.

It is seen that the commands of FIG. 5 are relatively static compared to other commands which need the illusion of change and movement.

I claim:

1. A peripheral vision display panel for automobile driver trainers, comprising, a driver trainer unit positioned in front of a projection screen, film projection means for imposing a predetermined pattern of images on said screen, a comparator coupled to said trainer unit to receive responses of a student operating said trainer in response to said images on said screen and comparing said responses with predetermined correct responses to said images, a display panel positioned on the trainer unit and within the peripheral vision area of the student, means responsive to said comparator connected to said display panel for presenting corrective command signals peripherally visible by a student in the trainer unit, said display panel including a steering signaling unit having a series of signaling indicators disposed in a laterally arranged pattern, and actuation means for sequentially activating said signaling indicators in the lateral direction corresponding to the corrective command signal, said actuation means including means for correlating the speed of sequential lighting of said steering signaling unit to the amount of corrective action indicated by said corrective command signals.

2. The structure of claim 1 wherein said signaling indicators are further defined as being lights and said laterally arranged pattern is arcuate in shape.

3. The structure of claim 1 wherein said display panel is positioned directly below the projection screen.

4. The structure of claim 1 wherein said display panel includes a series of vertically arranged gas command lights, actuation means for sequential lighting of said gas lights in the direction corresponding to the corrective command signal wherein said gas lights are sequentially lighted from bottom to the top for increasing speed and giving the illustion of forward movement and from the top to the bottom for decreasing speed.

5. The structure of claim 5 wherein said display panel includes a series of vertically arranged brake command lights, actuation means for sequential lighting of said brake lights in the direction corresponding to the corrective command signal wherein said brake lights are sequentially lighted from the top to the bottom for depressing the brake pedal and from the bottom to the top for releasing the brake pedal.

6. The structure of claim 1 wherein said display panel includes a series of vertically arranged gas command lights, actuation means for sequential lighting of said gas lights in the direction corresponding to the corrective command signal wherein said gas lights are sequentially lighted from bottom to the top for increasing speed and giving the illusion of forward movement and from the top to the bottom for decreasing speed, said display panel includes a series of vertically arranged brake command lights actuation means for sequential lighting of said brake lights in the direction corresponding to the corrective command signal wherein said brake lights are sequentially lighted from the top to the bottom for depressing the brake pedal and from the bottom to the top for releasing the brake pedal, said vertical rows of gas and brake lights being in side by side relationship corresponding to the gas and brake pedal positions in the driver trainer unit.

7. The structure of claim 6 wherein said gas lights are green in color and said brake lights are red in color and the speeds of sequential lighting of each of said rows of lights is correlated to the amount corrective action indicated by said corrective command signals.

8. The structure of claim 1 wherein said display panel includes a matrix of scanning light in horizontal and vertical rows, actuation means for sequential lighting of said scanning lights in rows from one side to the other side corresponding to the corrective command signal indicating the direction of required scanning required whereby a moving wedge illusion is simulated and appears to expand as it moves across the matrix of lights.

9. The structure of claim 1 wherein said panel includes a static light indicating when in a predetermined condition that no corrective action need be taken by the student driver in response to the driving situations on the projection screen.

References Cited

UNITED STATES PATENTS

| 3,019,415 | 1/1962 | Marion, Sr. | 340—82 |
| 3,041,579 | 6/1962 | Kanzenbach | 340—82 |
| 3,266,174 | 8/1966 | Bechtol et al. | 35—11 |
| 3,387,260 | 6/1968 | Wood | 340—82 |

WILLIAM H. GRIEB, Primary Examiner